July 3, 1951      D. M. SARTAIN      2,558,880

COMBINATION BUMPER AND LICENSE TAG HOLDER

Filed Jan. 14, 1949

Inventor

Don M. Sartain

By John N. Randolph

Attorney

Patented July 3, 1951

2,558,880

UNITED STATES PATENT OFFICE 2,558,880

COMBINATION BUMPER AND LICENSE TAG HOLDER

Don M. Sartain, Marion, N. C.

Application January 14, 1949, Serial No. 70,895

3 Claims. (Cl. 293—61)

This invention relates to a novel combination bumper and license tag holder for bicycles, motorcycles and motor bikes and has for its primary object to provide a structure of extremely simple construction capable of being readily mounted on the front or rear of a bicycle, motorcycle or motor bike to afford a bumper for said end of the vehicle and also a convenient and practical support for a license tag as required in most States.

More particularly, it is an object of the present invention to provide a structure capable of being readily mounted on either the front or rear of most bicycles, motor bikes and motorcycles and which will support a license tag thereon in a conspicuous position for display but yet in a protected position to prevent damage thereto in the event that said end of the vehicle is struck or strikes another vehicle or other object.

A further object of the invention is to provide a combination license tag support and bumper and the individual parts of which may be readily replaced if broken or damaged and without replacing the entire unit.

Various other objects and advantages of the invention will hereinafter become more fully apparent from the following description of the drawing, illustrating a preferred embodiment thereof, and wherein.

Figure 1:
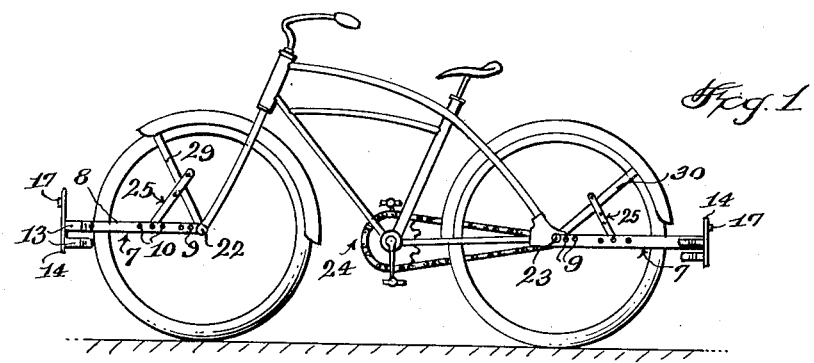
Figure 1 is a side elevational view showing a bicycle with one of the combination license tag holder and bumper units mounted on each end thereof.

Referring more specifically to the drawing, the combination license tag holder and bumper in its entirety is designated generally 7 and includes a pair of supporting arms 8 having in corresponding ends thereof a series of longitudinally spaced openings 9 and intermediate of their ends, a series of longitudinally spaced openings 10. The arms 8 are provided with opposite inturned ends 11 which are apertured, for a purpose which will hereinafter become apparent.

Figures 2, 5:
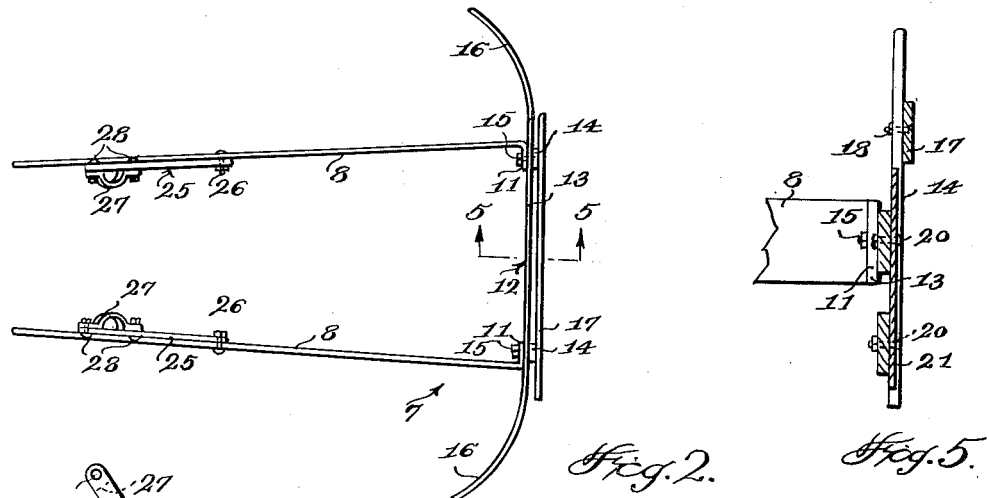
Figure 2 is an enlarged top plan view of one of the units shown demounted.
Figure 5 is a sectional view taken substantially along a plane as indicated by the line 5—5 of Figure 2.
Figures 3, 6:
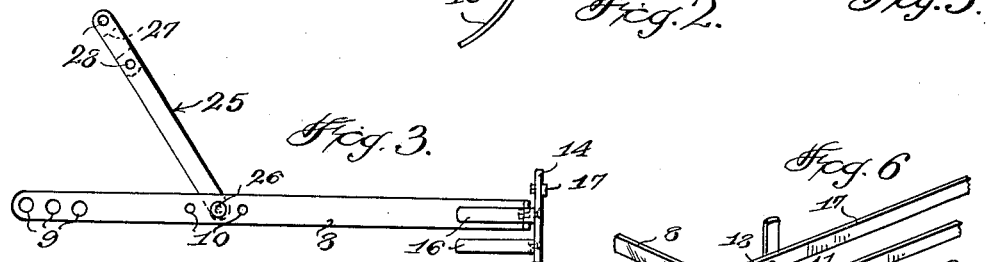
Figure 3 is a side elevational view thereof.
Figure 6 is a fragmentary perspective view of a portion of the unit.
Figure 4:
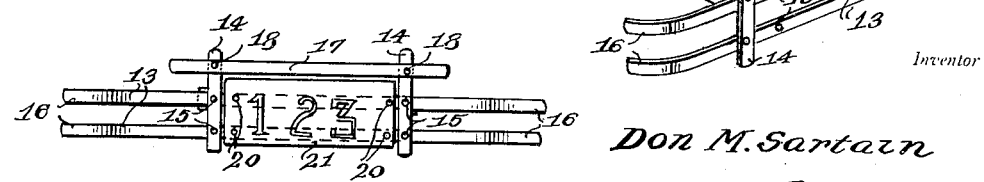
Figure 4 is an end elevational view of the bumper and license tag holder looking from right to left of Figures 2 and 3.

The bumper and tag mount 12 includes a pair of corresponding transversely extending bars 13 which are vertically spaced and connected in spaced relationship by longitudinally spaced upright bars 14. The bars 14 are secured to the outer side of the bars 13 and transversely thereof by nut and bolt fastenings 15. The upper fastenings 15 which extend through the upper bar 13 likewise extend through the apertures of the inturned ends 11 of the arms 8, which are disposed against the opposite or inner sides of said bar 13 for mounting the bumper and tag mount 12 on the arms 8. The end portions of the bars 13, beyond the upright bars 14, are curved inwardly or toward the arms 8, as best indicated at 16 in Figures 2 and 3. A shorter top bar 17 is disposed above the level of the upper bar 13 and substantially parallel thereto and engages against the outer sides of the upright bars 14 and is attached thereto by additional nut and bolt fastenings 18. The bars 13, between and adjacent the upright bars 14 are provided with openings 19 for receiving nut and bolt fastenings 20 for detachably mounting a license tag 21 on the bumper and support unit 12 and against the outer side of the bars 13 and between the bars 14 and beneath the bar 17 so that said bars 14 and 17 will provide a guard around the tag 21 to protect the tag in the event that the bumper strikes or is struck by another vehicle or obstruction.

Corresponding openings 9 of the arms 8 are adapted to selectively engage end portions of either the front axle 22 or the rear axle 23 of a bicycle, motorcyle or motor bike, such as the bicycle 24 as illustrated in Figure 1 and said arms 8 extend outwardly from the axle in substantially a horizontal plane for mounting the bumper and tag support 12 beyond either the front or rear wheel of the vehicle, as illustrated in Figure 1. The arms 8 are detachably retained in engagement with either the axle 22 or 23 by the usual axle nuts, not shown. To support the bumper and tag holder 7 in substantially a horizontal plane as illustrated in Figure 1, each of the supporting arms 8 is provided with a brace, designated generally 25 including a bar having a nut and bolt fastening 26 at one end thereof for selectively engaging in one of the openings 10 of the arm 8 with which it is associated. The opposite end of said bar is provided with a separate clamp section 27 attached thereto by a pair of nut and bolt fastenings 28 and by means of which the brace 25 is detachably and adjustably clamped to a front or rear wheel fender brace 29 or 30, respectively, for detachably supporting and maintaining the arms 8 in horizontal planes.

From the foregoing it will be readily apparent that a novel bumper and license tag holder has been provided for use on two wheel vehicles and which is capable of being detachably mounted on either end of the vehicle to afford a bumper for said end and a support for a license tag and by means of which the license tag will be supported in a conspicuous position as required yet protected from injury or damage due to impact of objects with the bumper. It will also be noted that all of the various parts forming the combination bumper and support 7 are capable of being individually replaced if damaged and without the necessity of replacing any of the other parts.

Various modifications and changes are contemplated and may obviously be resorted to, without departing from the spirit or scope of the invention as hereinafter defined by the appended claims.

I claim as my invention:

1. A bumper for motorcycles, bicycles and motor bikes, comprising a pair of supporting arms adapted to be adjustably mounted adjacent corresponding ends thereof on end portions of a wheel axle of a bicycle, motor bike or motorcycle and extending outwardly therefrom, vertically spaced horizontal bars disposed transversely of said arms, upright bars disposed transversely of the first mentioned bars and on the outer sides thereof, fastening means connecting the horizontal and upright bars, said arms having inturned opposite ends detachably secured to certain of said bars by the fastening means, said horizontal bars having license tag fastening receiving openings disposed between the upright bars, and brace members adjustably connected to said supporting arms and extending upwardly therefrom, said brace members having clamps at their upper ends for detachably and adjustably engaging a fender brace for maintaining said supporting arms in substantially horizontal positions.

2. A license tag holder as in claim 1, and a bar secured to the outer sides of said upright bars and above the first mentioned bars and combining with said upright bars to form a license tag guard.

3. A bumper for motorcycles, bicycles and motor bikes comprising a pair of supporting arms adapted to be detachably and adjustably mounted on end portions of a wheel axle and extending outwardly therefrom, a bumper detachably mounted on the outer ends of said arms and transversely thereof, said bumper unit being formed of detachably connected horizontally and vertically extending bars defining a license tag receiving recessed portion, and brace members detachably and adjustably connected to said supporting arms and extending upwardly therefrom, said brace members having clamp portions at their upper ends for detachably and adjustably engaging a fender brace for supporting said arms in substantially horizontal positions.

DON M. SARTAIN.

REFERENCES CITED

The following references are of record in the file of this patent:

UNITED STATES PATENTS

| Number | Name | Date |
|---|---|---|
| 2,194,660 | Huff | Mar. 26, 1940 |
| 2,280,558 | Thompson | Apr. 21, 1942 |

FOREIGN PATENTS

| Number | Country | Date |
|---|---|---|
| 150,676 | Austria | Sept. 25, 1937 |